United States Patent
Wu (10) Patent No.: US 6,199,416 B1
(45) Date of Patent: Mar. 13, 2001

(54) MOTORCYCLE LOCK

(75) Inventor: Wen-Chieh Wu, Tainan (TW)

(73) Assignee: Bee Shen Enterprise Co., Ltd., Tainan (TW)

( * ) Notice: Subject to any disclaimer, the term of this patent is extended or adjusted under 35 U.S.C. 154(b) by 0 days.

(21) Appl. No.: 09/560,338

(22) Filed: Apr. 28, 2000

(51) Int. Cl.⁷ .................................................. B62H 5/16
(52) U.S. Cl. ................................................ 70/227; 70/233
(58) Field of Search ...................................... 70/227, 233

(56) References Cited

U.S. PATENT DOCUMENTS

| | | | |
|---|---|---|---|
| 3,781,861 | * 12/1973 | Adler, Jr. et al. | 70/233 X |
| 3,824,540 | * 7/1974 | Smith, II | 70/233 X |
| 4,180,998 | * 1/1980 | Hellman | 70/233 X |
| 4,459,833 | * 7/1984 | Waterkamp et al. | 70/233 X |
| 5,069,049 | * 12/1991 | Shieh | 70/233 X |
| 5,265,451 | * 11/1993 | Phifer | 70/226 |
| 5,507,160 | * 4/1996 | Shieh | 70/233 |
| 5,515,947 | * 5/1996 | Shieh | 70/233 X |
| 5,517,837 | * 5/1996 | Wang | 70/233 X |
| 5,526,661 | * 6/1996 | Lin | 70/233 |
| 5,530,427 | * 6/1996 | Shieh | 70/233 X |
| 5,628,214 | * 5/1997 | Evers | 70/227 |
| 5,709,113 | * 1/1998 | Godfrey | 70/227 X |

* cited by examiner

*Primary Examiner*—Lloyd A. Gall (57) ABSTRACT

A motorcycle lock includes a base, a locking device, a locking rod, a stop plate, a fix plate, a constrictor and a housing. The locking device consists of a base block, a slide block and a position plate. The stop plate hides the locking device located in the base to prevent the lock from being unlocked illegally, and the base with the housing is fixed on a front fork of a motorcycle by a constrictor. In locking, a push plate is swung 90 degrees to align it with the locking rod and push it rearward into a front wheel, in thus locking the wheel without using the key and hampering the front wheel from rotating. In unlocking a key is used to permit the locking rod to retreat to its original unlocked position by a spring.

6 Claims, 14 Drawing Sheets

MOTORCYCLE LOCK

BACKGROUND OF THE INVENTION

This invention relates to a motorcycle lock, particularly to one locked on a front fork having a stop plate to prevent the lock from being removed from the front fork, equipped with extremely good anti-theft function, locking and unlocking with only one hand, not to be lost, as always secured stabilized on a motorcycle even during running and safely.

Figure 1:
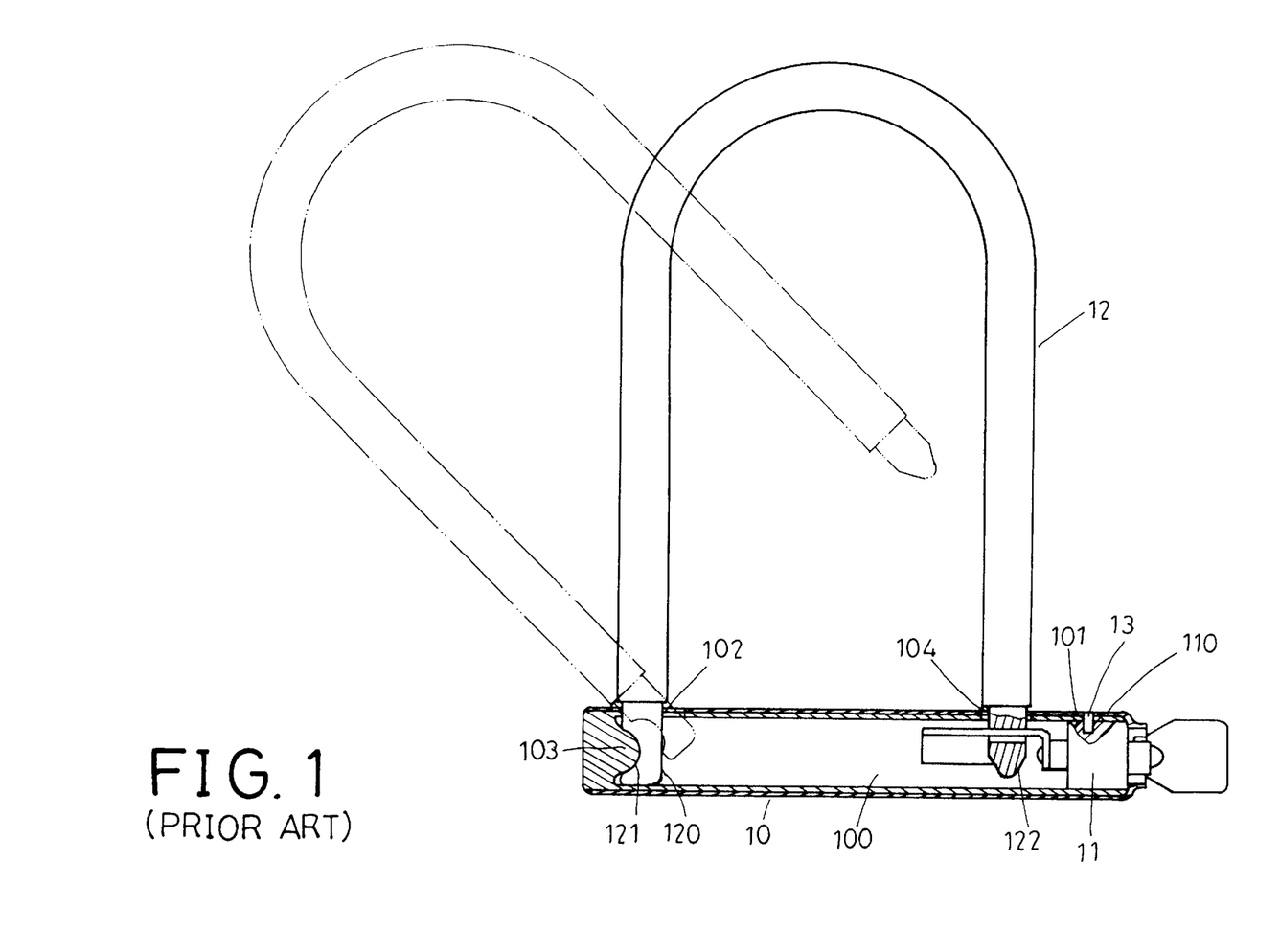
FIG. 1 is a cross-sectional view of a conventional motorcycle lock.
Figure 2:
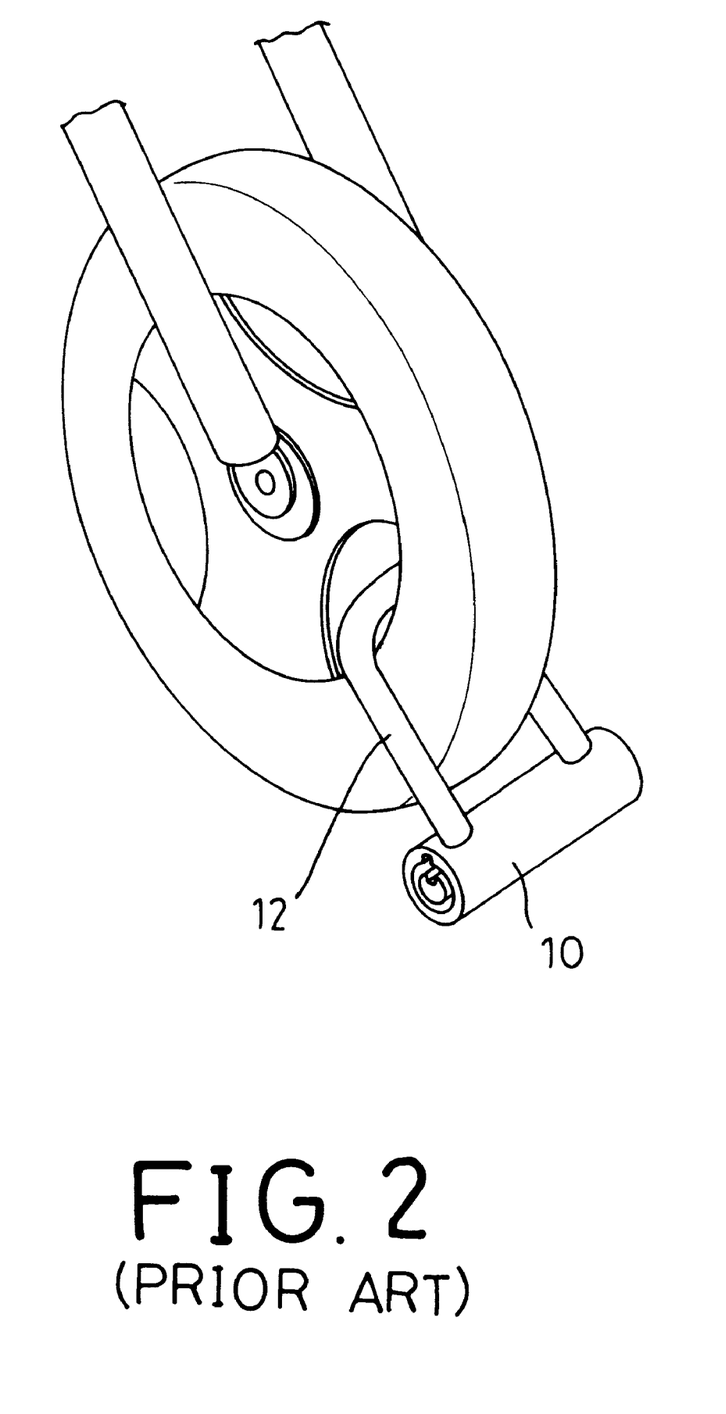
FIG. 2 is a perspective view of the conventional motorcycle lock locking a wheel of motorcycle.

A known conventional motorcycle lock shown in FIG. 1 includes a cylindrical base 10, a locking base 11 placed in a front portion of a hollow interior 100 of the cylindrical base 10, a pin hole 101, 110 respectively provided in the cylindrical base 10 and the locking base 11 for a pin 13 to fit therein to secure the locking base 11 with the cylindrical base 10. Provided that the motorcycle lock is to be locked, a foot 120 of a U-shaped shank 12 is inserted in an oval shank hole 102, with a recess 121 of the foot 120 is engaging a swelled stop 103 at a left end of the hollow interior 100, and then the shank 12 is moved to an upright position to let the other foot 122 insert in another oval shank hole 104 to be locked by the locking base 11, with the U-shaped shank 12 locked immovable from the cylindrical base 10.

However, the known conventional motorcycle lock has the following disadvantages.

1. It has to be placed on a motorcycle body in case of unused, taking not a small space, and liable to produce colliding noise during running.
2. If it is not placed in a case, it is prone to be stolen or fall down or lost.
3. Both hands have to be used in locking or unlocking, inconvenient.
4. When it is locked around a wheel, it easily gets dirty, with hands also getting dirty. And it has to be cleaned before it is placed in a case, or other things put in the case may also be smeared.

SUMMARY OF THE INVENTION

This invention has been devised to offer a motorcycle lock, always fixed on a front fork whether in use or not, having a locking rod pushed to move into a front wheel to preventing it from rotating, i. e. locking the lock, by means of a push plate pivotally connected to the locking rod.

The feature of the invention is a stop plate closing up a hollow chamber of a base wherein a locking means are contained to prevent the lock from prying unlocked by tools illegally. Further, a locking rod and a push plate are pivotally connected to each other so that the push plate may be aligned to push the locking rod rearward into a front wheel to prevent it from rotating, that is, locking the lock. If the lock is not locked, the push plate is located vertical to the locking rod, which is retreated from the interior of the front wheel, not interfering rotation of the front wheel. In addition, locking and unlocking can be operated only by one hand, very convenient.

BRIEF DESCRIPTION OF DRAWINGS

Thin invention will be better understood by referring to the accompanying drawings.

BRIEF DESCRIPTION OF THE PREFERRED EMBODIMENT

Figure 3:
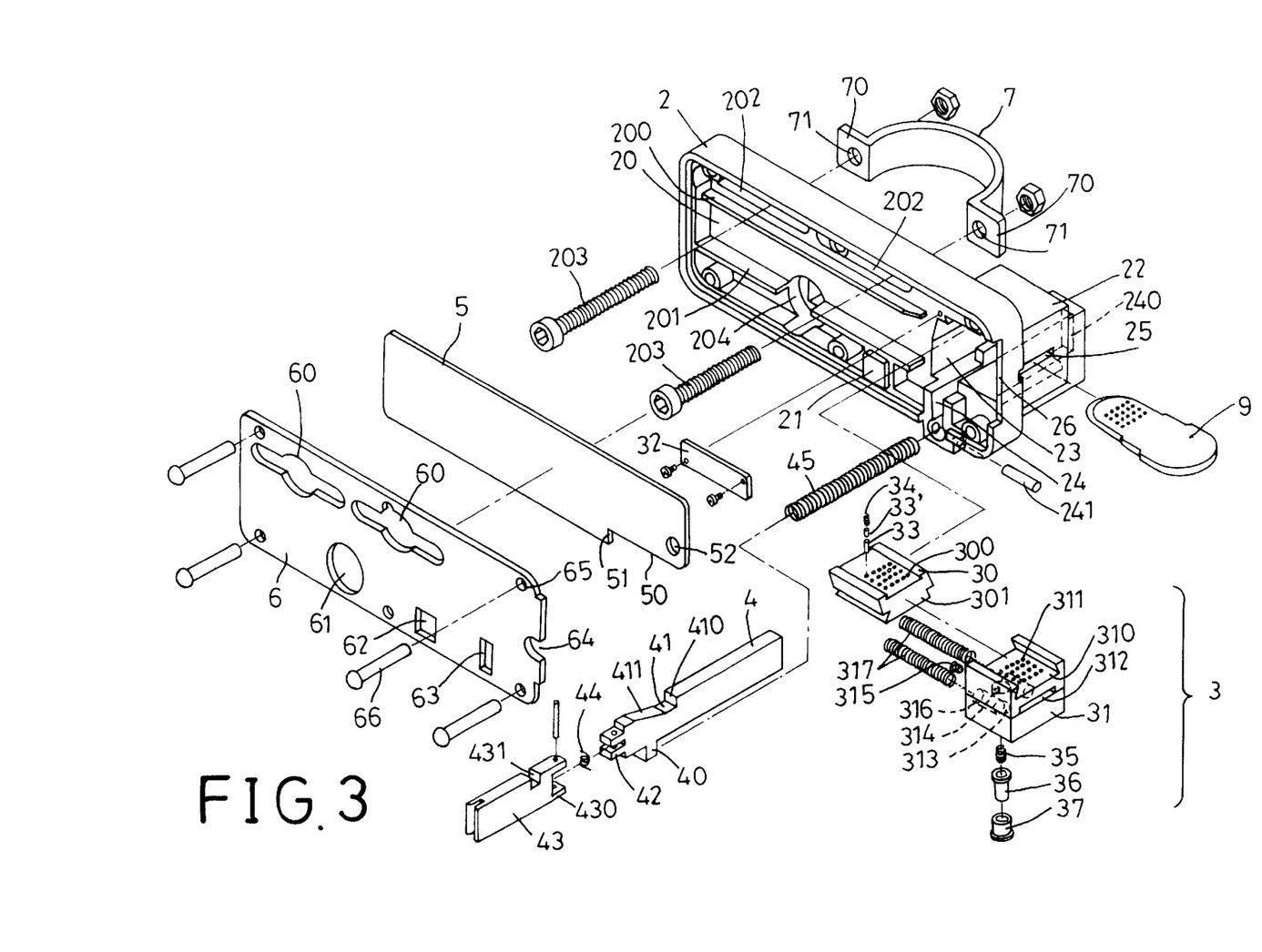
FIG. 3 is an exploded perspective view of a motorcycle lock in the present invention.
Figure 4:
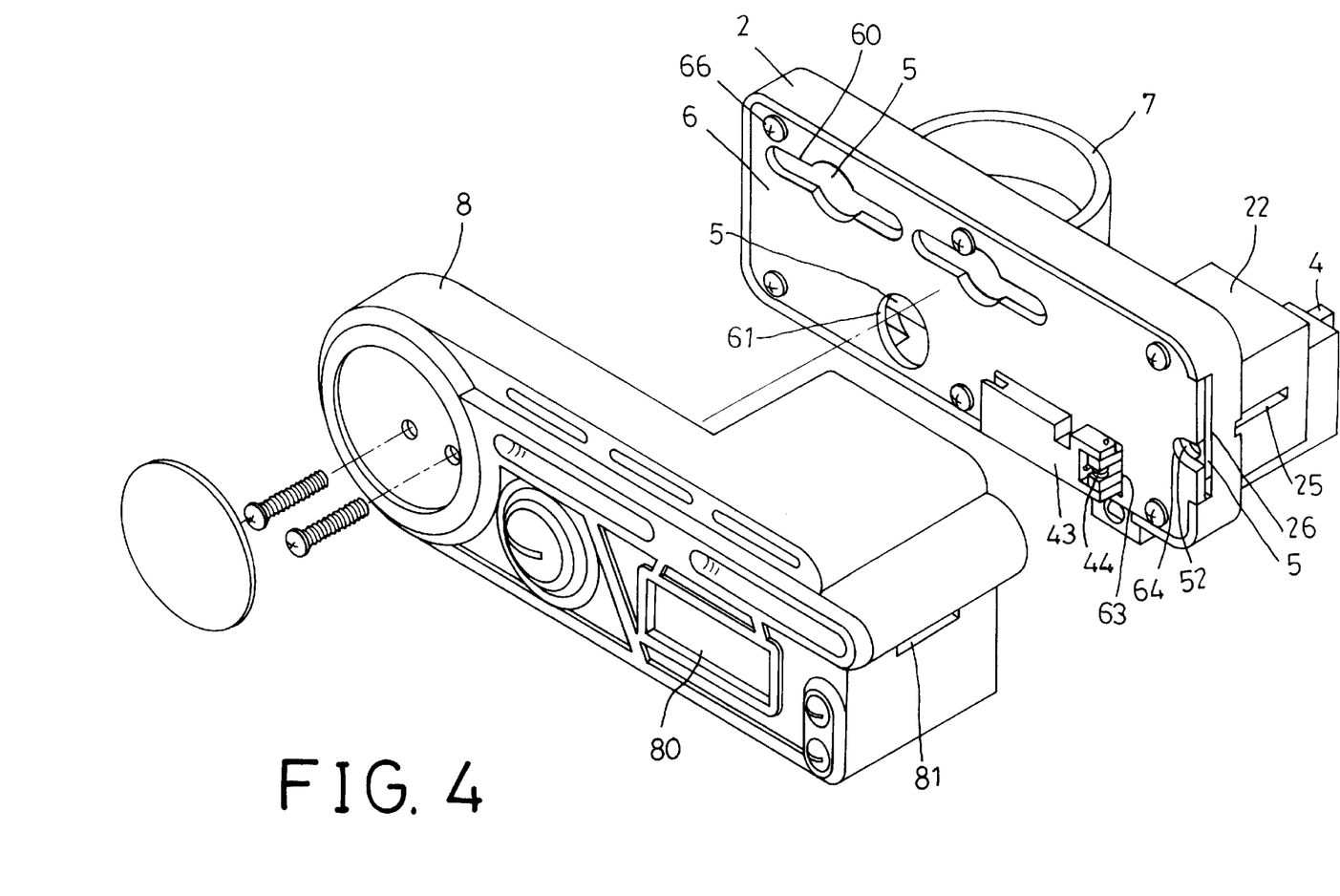
FIG. 4 is a perspective view of a housing and a locking means in the present invention.

A preferred embodiment of a motorcycle lock in the present invention, as shown in FIGS. 3 and 4, includes a base 2 having a hollow chamber 20 in a front portion, an upper elongate plate 200 and a lower position plate 201 fixed in the hollow chamber 20, two elongate slots 202 in a rear wall of the hollow chamber 20 above the upper elongate plate 200, bolts 203 extending in the slots 202, and a hole 204 bored in the position plate 201. Further, a magnet 21 is fixed in a lower portion of the hollow chamber 20, and a locking member 22 is fixed to extend rearward from the base 2, and an opening 23 is provided in a right side, extending into an interior of the locking member 22. A slide groove 24 is formed under the opening 23, extending to a hole 240 bored in a rear side of the locking member 22, having a stop pin 241 placed in a front end of the slide groove 24. Further, the locking member 22 has a keyhole 25 in a sidewall extending to the opening 23, and a cut 26 on a sidewall of the base 2.

A locking means 3 is positioned in the opening 23 of the base 2, consisting of a base block 30, a slide block 31, and a position plate 32. The base block 30 is inserted in an upper portion of the opening 23, having plural holes 300 and a dovetail lower portion 301. The slide block 31 is positioned under the base block 30, having a dovetail groove 310 to engage the dove-tail portion 301 of the base block 30, plural holes 311 regularly bored on a surface between the two dovetail grooves 310 to correspond to the holes 300 of the base block 30. Two locking pins 33, 33' and a spring 34 are inserted vertically in each of the holes 300 and 311. The slide block 31 has a keyhole 312 in one sidewall aligned to the key hole 25 of the locking member 22. The slide block 31 further has a recess 313 in the bottom for a spring 35, a pin 36 and a sleeve 37 orderly fit therein, with the pin 36 passing through the sleeve 37 to extend in the bottom of the slide block 31. The slide block 31 further has a threaded hole 314 on the other side for a screw to screw in to secure the sleeve 37 in the recess 313, and a hole 316 respectively bored at two sides of the threaded hole 314 for containing a spring 317. The base 2 has a position plate 32 fixed on outer wall on the opening 23 to keep the base block 30 in the opening 23.

A locking rod 4 is located in the slide groove 24 of the base 2, having a downward projection 40, an insert cut 41 on an upper surface, a stop surface 410 formed at an end of the surface, two ears 42 formed in a front end, and a push plate 43 pivotally connected to the front end of the locking rod 4 and having two ears 430 pivotally connected to the two ears 42 of the lock rod 4. And a spring 44 is provided around the pivot to push the push plate 43 formed 90 degrees to the lock rod 4. The push plate 43 has a groove 431 on an upper surface, and an elongate coil spring 45 is located in the bottom of the slide groove 24, with one end resting on an inner wall of the slide groove 24 and the other end resting on the downward projection 40 of the push plate 43. A stop plate 5 is further provided in the hollow chamber 20 of the base 2, between the upper elongate plate 200 and the lower position plate 201, having a recess 50 formed in a lower right side, and a stop surface 51 at a left side of the recess 50, and a bolt hole 52 in a right end.

Further, a fix plate 6 is provided to close up the hollow chamber 20 of the base 2, having two slots 60 and a round hole 61 corresponding to the elongate slots 202 and the hole 204, and a hole 62 facing the magnet 21 of the base 2, and a square hole 63 facing the slide groove 24, and a notch 64 in a right end to aligned to the hole 52, and plural holes for bolts 66 to pass through to secure the fix plate 6 with the base 2.

A constrictor 7 of a semicircular shape is further fixed on a rear wall of the base 2, screwed tightly with bolts 203, having two end flat position plates 70 each with a hole 71, to be fixed around a front fork of a motorcycle.

Lastly a housing 8 is provided to cover an outer surface of the base 2, as shown in FIG. 4, having an opening 80 to correspond to the locking rod 4 and the push plate 43, a keyhole 81 aligned to the keyhole 25 of the locking member 22. And a key 9 is provided to insert in the keyholes 81, 25 and 312 to unlock this lock.

Figure 5:
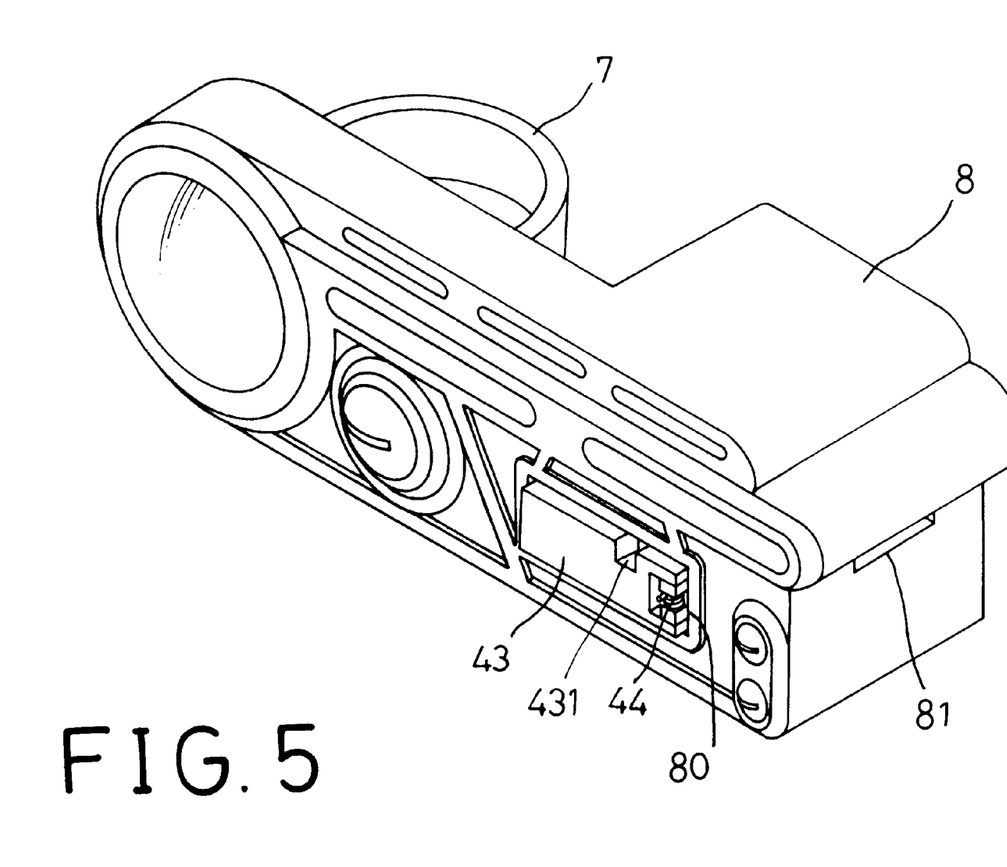
FIG. 5 is a perspective view of the motorcycle lock in the present invention.
Figure 7:
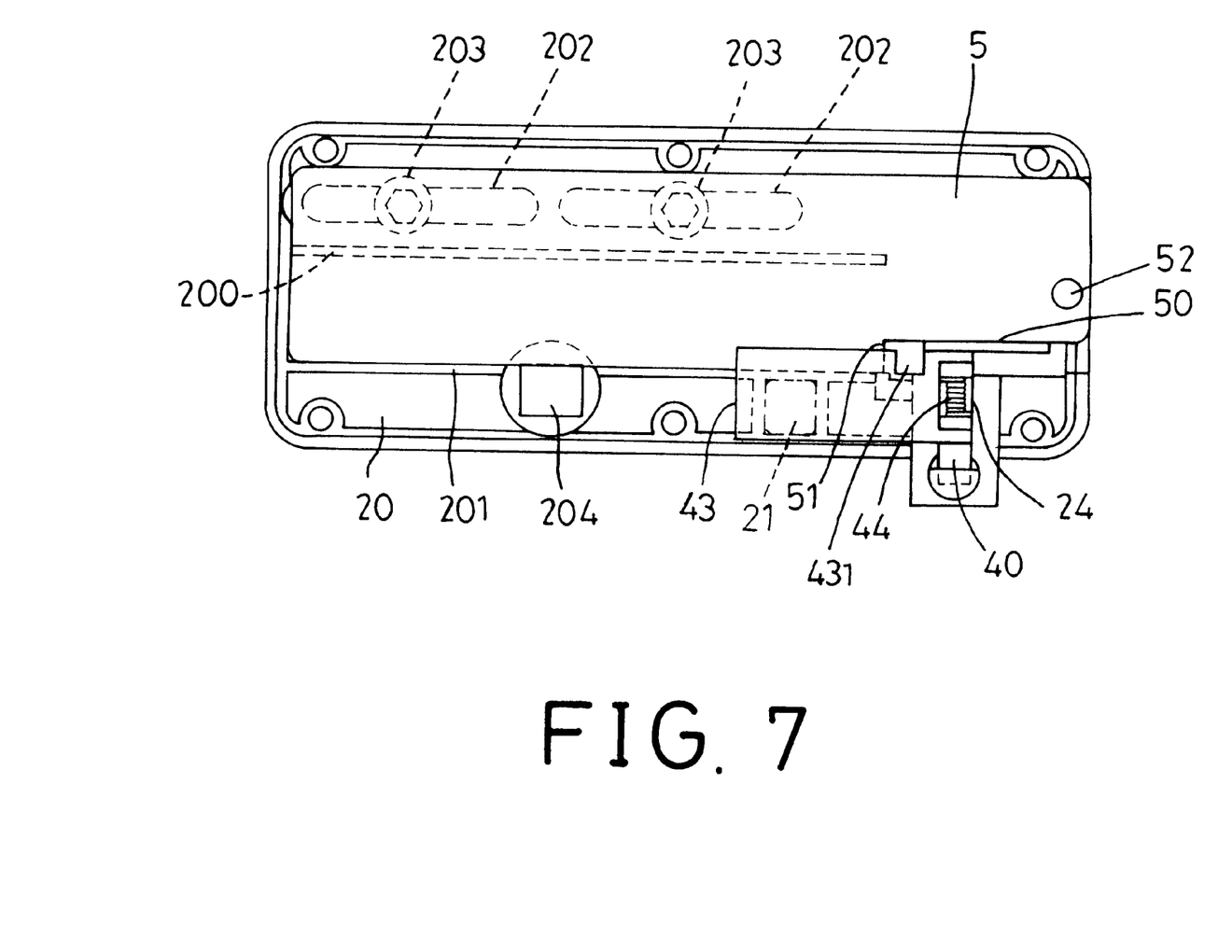
FIG. 7 is a front view of a stop plate hiding bolts and various holes in the present invention.

In assembling, referring to FIGS. 3, 4 and 5, firstly, the push plate 43 and the spring 44 are pivotally connected to the front portion of the locking rod 4, and then the spring 45 is placed in a lower portion of the slide groove 24, and the locking rod 4 is inserted in the slide groove 24 of the base 2, letting one end of the spring resting on the inner wall of the slide groove 24, and the other end resting on the downward projection 40 of the locking rod 4, with the stop pin 241 placed at the front end of the downward projection 40 of the locking rod 4 to prevent the locking rod 4 from separating from the slide groove 24. Next, the slide base 31 and the base block 30 is combined together by engaging the dove-tail groove 310 with the dovetail portion 301, and then the lock pins 33, 33' and the spring 34 orderly are inserted in the holes 311 and 300, with the locking pin 33' engaging between the slide base 31 and the base block 30. Then two springs 317 are respectively inserted in the holes 316, and then the spring 35, the pin 36 and the sleeve 37 are orderly inserted in the recess 313 of the slide block 31, with the bolt 315 screwing with to secure the sleeve 37. Then the assembled lock means 3 is placed in an upper portion of the opening 23, with the position plate 32 fixed on the outer sidewall on the opening 23. The outer ends of the two springs 317 in the holes 316 of the slide block 31 resting against the sidewall of the opening 23, with the stop pin 36 in the bottom of the slide block 31 resting against in the insert cut 41 of the locking rod 4, and with the key hole 312 aligned to the key hole 25 in a side wall of the lock member 22. Next, two bolts 203 respectively pass through the elongate slots 202 of the base 2 and screw with the holes 71 of the constrictor 7. Then the stop plate 5 is fixed in the hollow chamber 20 of the base 2, with its rear side resting against the upper elongate plate 200, and with the lower edge resting on the position plate 201 to hide the elongate slots 202 and the hole 204, as shown in FIG. 7. The recess 51 of the stop plate 5 strides on the lock rod 4, with the stop surface 51 stopped by a side of the lock rod 4. Then the fix plate 6 is secured on the hollow chamber 20 of the base 2 with bolts 66. The push plate 43 pivotally connected to the front end of the lock rod 4 extends through the rectangular hole 63 of the fix plate 6, and pushed against the wall of the fix plate 6 by means of elasticity of the spring 44. The magnet 21 of the base 2 protrudes through the square hole 62 of the fix plate 6 to attract the push plate 43 to secure it on the fix plate 6. Lastly, the housing 8 is covered around the base 2, finishing assemblage of the lock.

Figure 6:
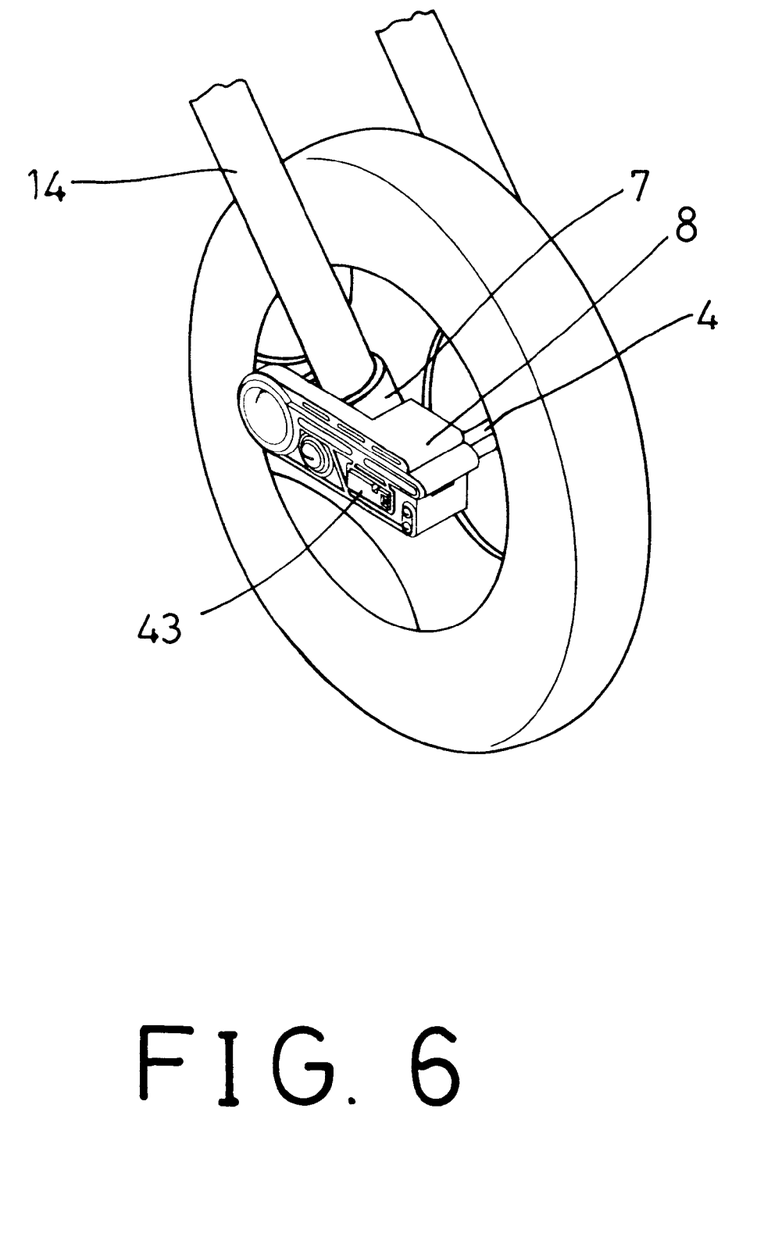
FIG. 6 is a perspective view of the motorcycle used to lock a wheel of a motorcycle.
Figure 8:
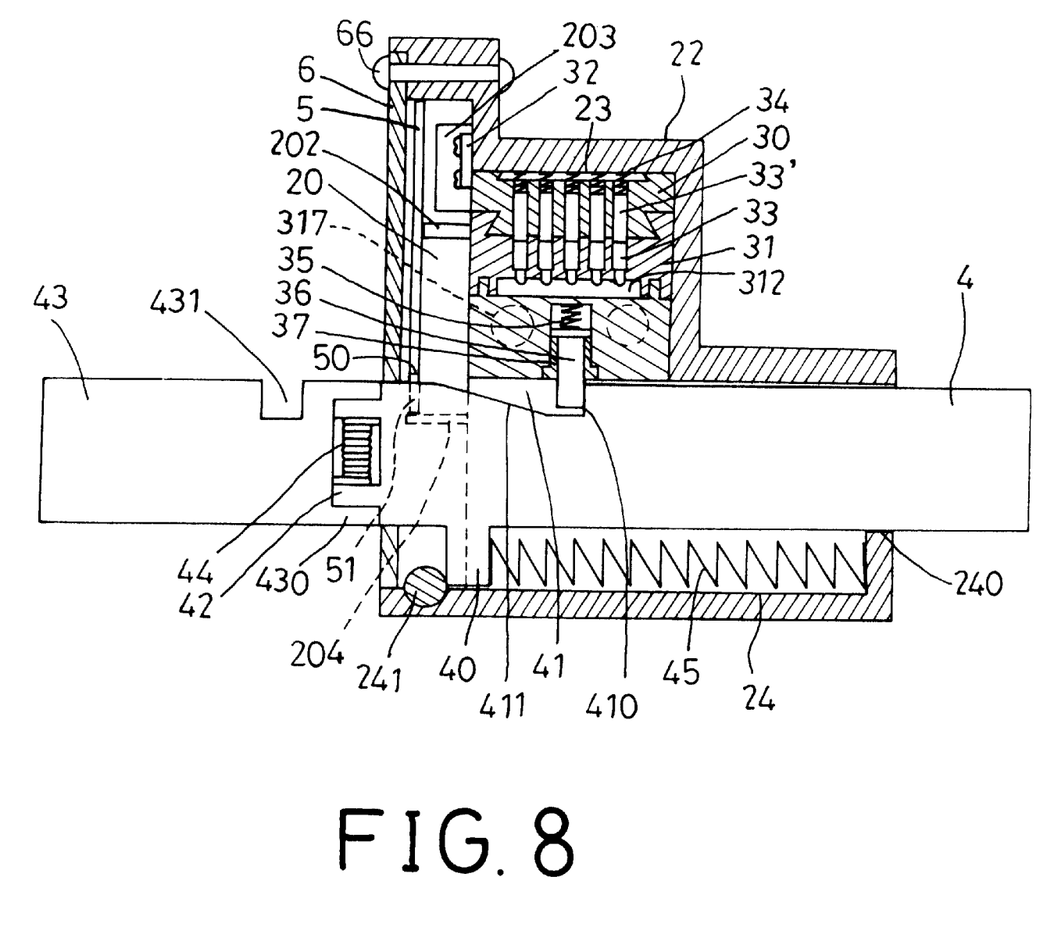
FIG. 8 is a side cross-sectional view of a push plate swung and aligned to a locking plate in the present invention.
Figure 9:
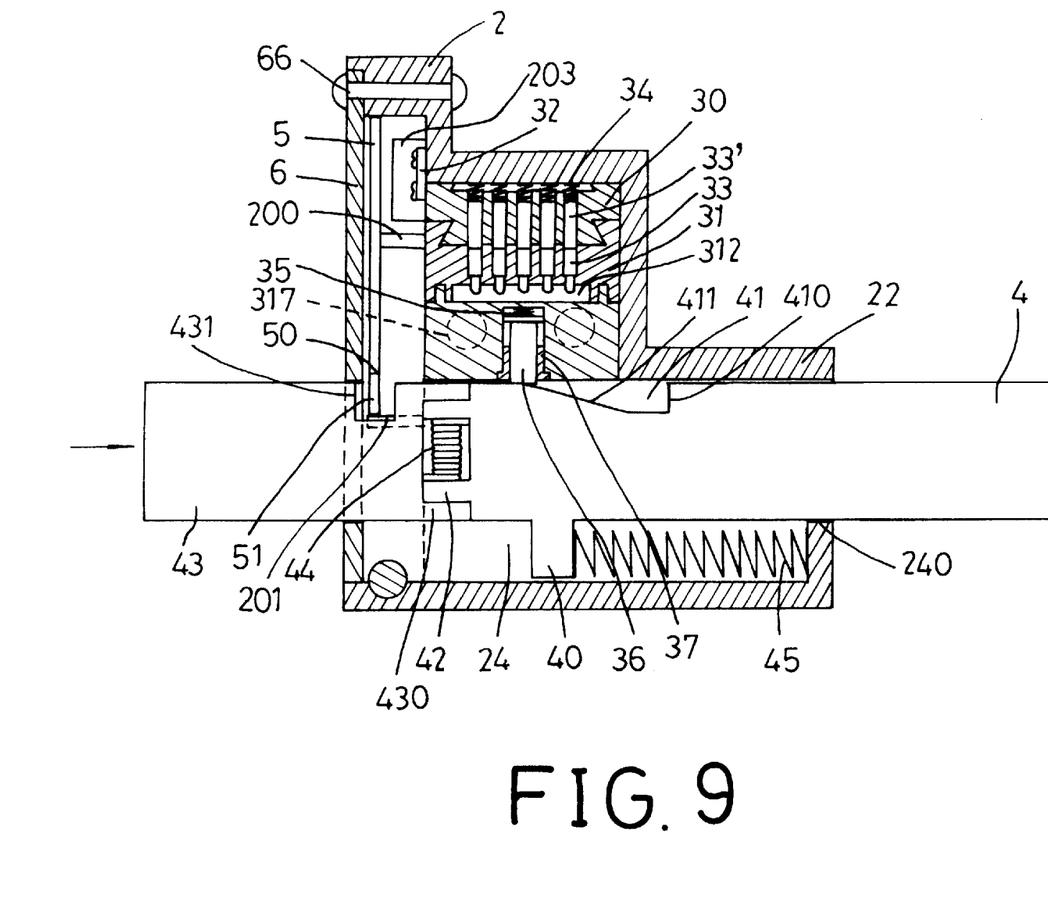
FIG. 9 is a side cross-sectional view of the stop plate pulled out of a hollow chamber of a base in the present invention.
Figure 10:
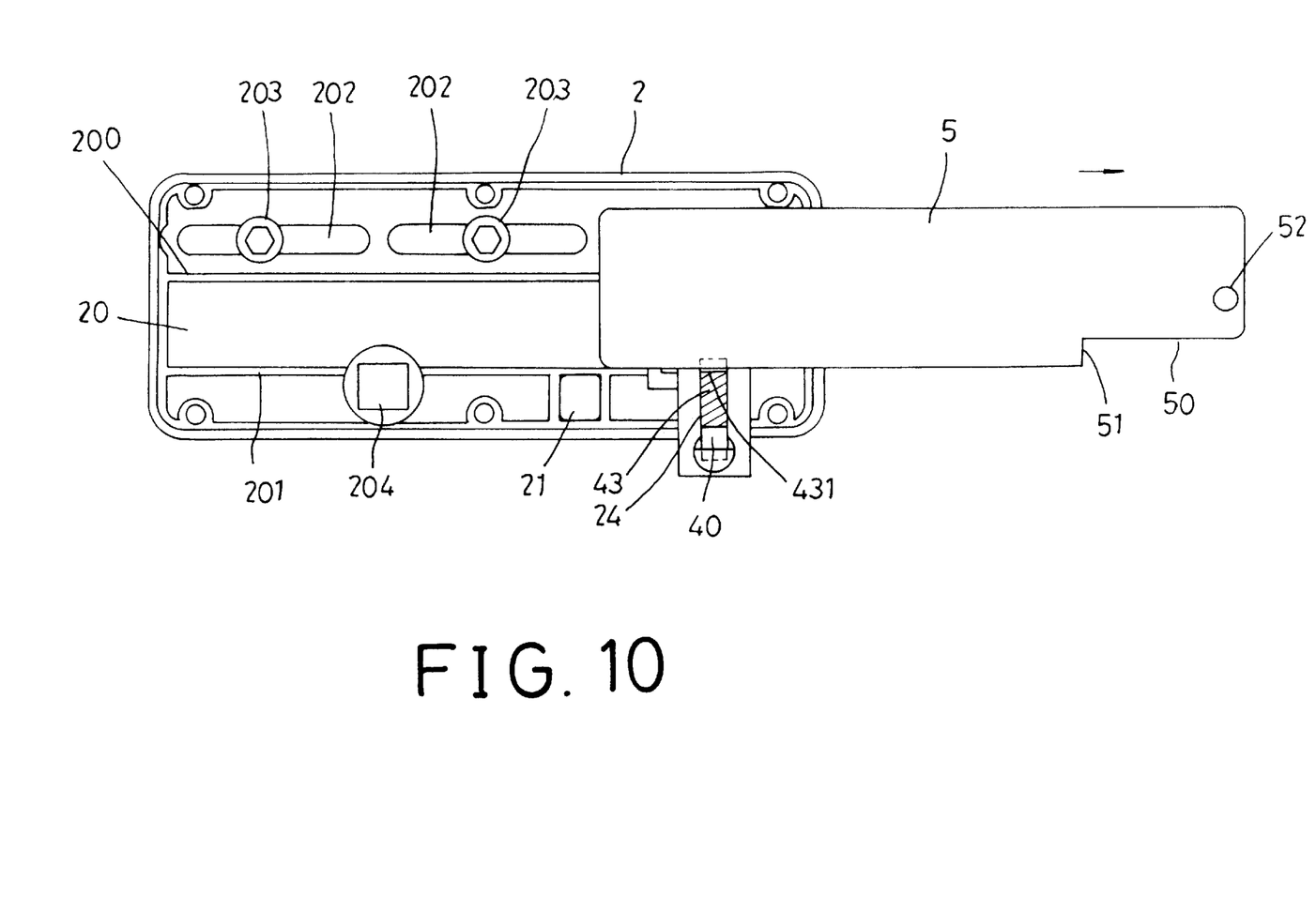
FIG. 10 is a front view of the stop plate pulled out of the hollow chamber of the base in the present invention.

In using the lock, referring to FIGS. 4 and 6, firstly, swing the push plate 43 outward 90 degrees to align it to the locking rod 4, as shown in FIG. 8, and push the push plate 43 into the slide groove 24 as shown in FIG. 9, with the locking rod 4 sliding rearward together. Then the downward projection 40 of the lock rod 4 compress the spring 45 until the push plate 43 has its groove 431 aligned to the stop plate 5. The stop plate 5 is pulled out of the hollow chamber 20 and the groove 431 and the cut 26 of the base 2, as shown in FIG. 10. Then the stop plate 5 no longer hides the two elongate slots 202 and the hole 204. Then the base 2 can be placed at one side of a front fork and the constrictor 7 may fit around the front fork 14, with the two ends of the constrictor 7 rest against the rear sidewall of the base 2, letting the bolts 203 screw with the holes 71 of the constrictor 7, and with a driver screwing the bolts 203 with the constrictor 7 to secure the motorcycle lock stabilized on the front fork 14 of a motorcycle. Then the stop plate 5 is pushed to move into the hollow chamber 20 to hide again the slots 202 and the hole 204, with the push plate 43 no more inserted in the slide groove 24 by means of the groove 431 not restricted by the stop plate 5. Then the locking rod 4 is elastically pushed by the spring 45 recovering its elasticity, also pushing the push plate 43 outward. Then the push plate 43 is moved by the spring 44 to form 90 degrees against the locking rod 4 and attracted to the magnet 21 of the base 2, with the stop plate 5 having its stop surface 51 stopped by the side wall of the lock rod 4, impossible to move out, and the housing 8 is covered around the base 2. Thus, the lock is locked around the front fork of the motorcycle, with the stop plate 5 hampering any tools from extending in the slots 202 and the hole 204 to loosen the bolts 203 to unlock stealthily this motorcycle lock.

Figure 11:
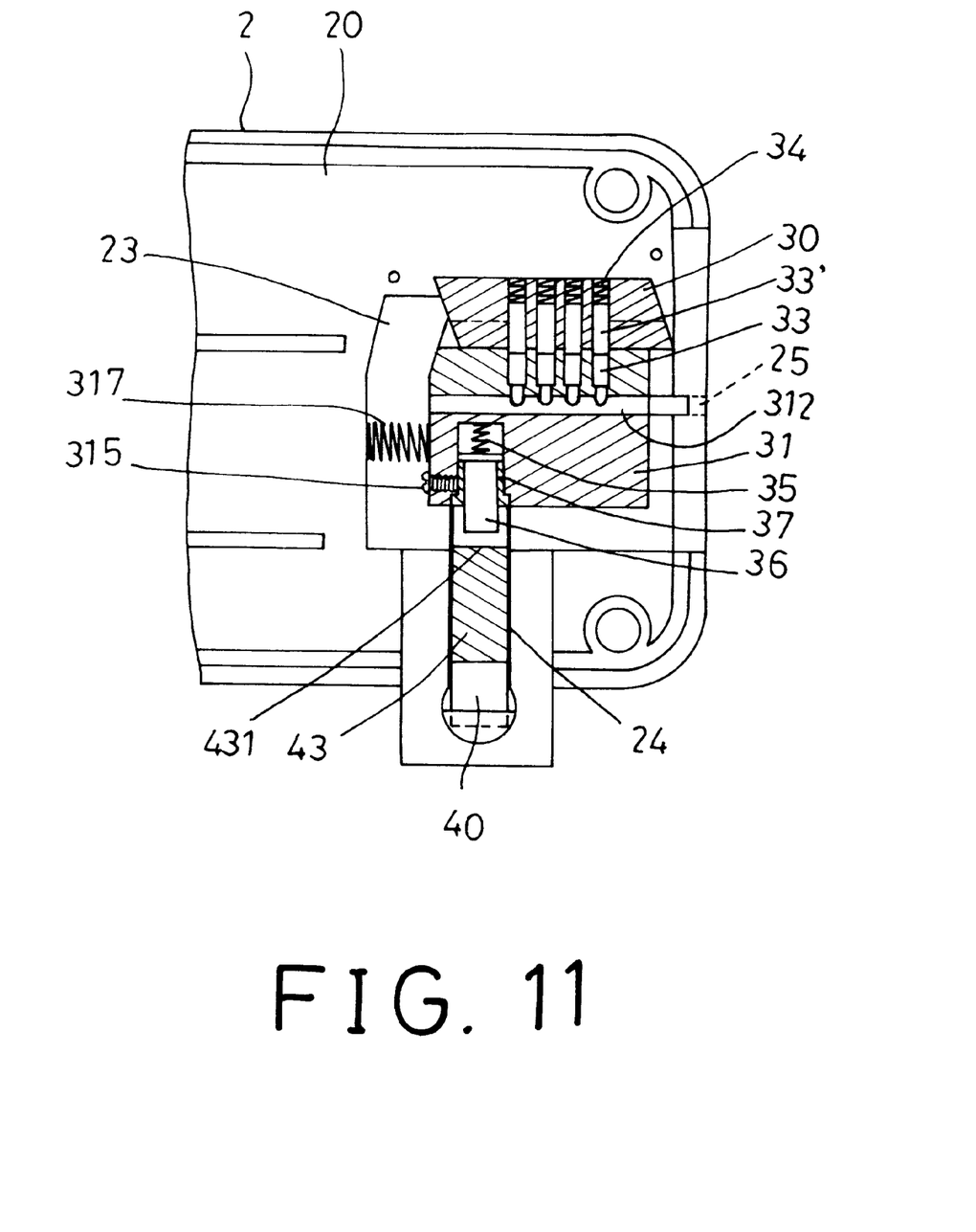
FIG. 11 is a front view of the motorcycle lock being in a locking position in the present invention.
Figure 12:
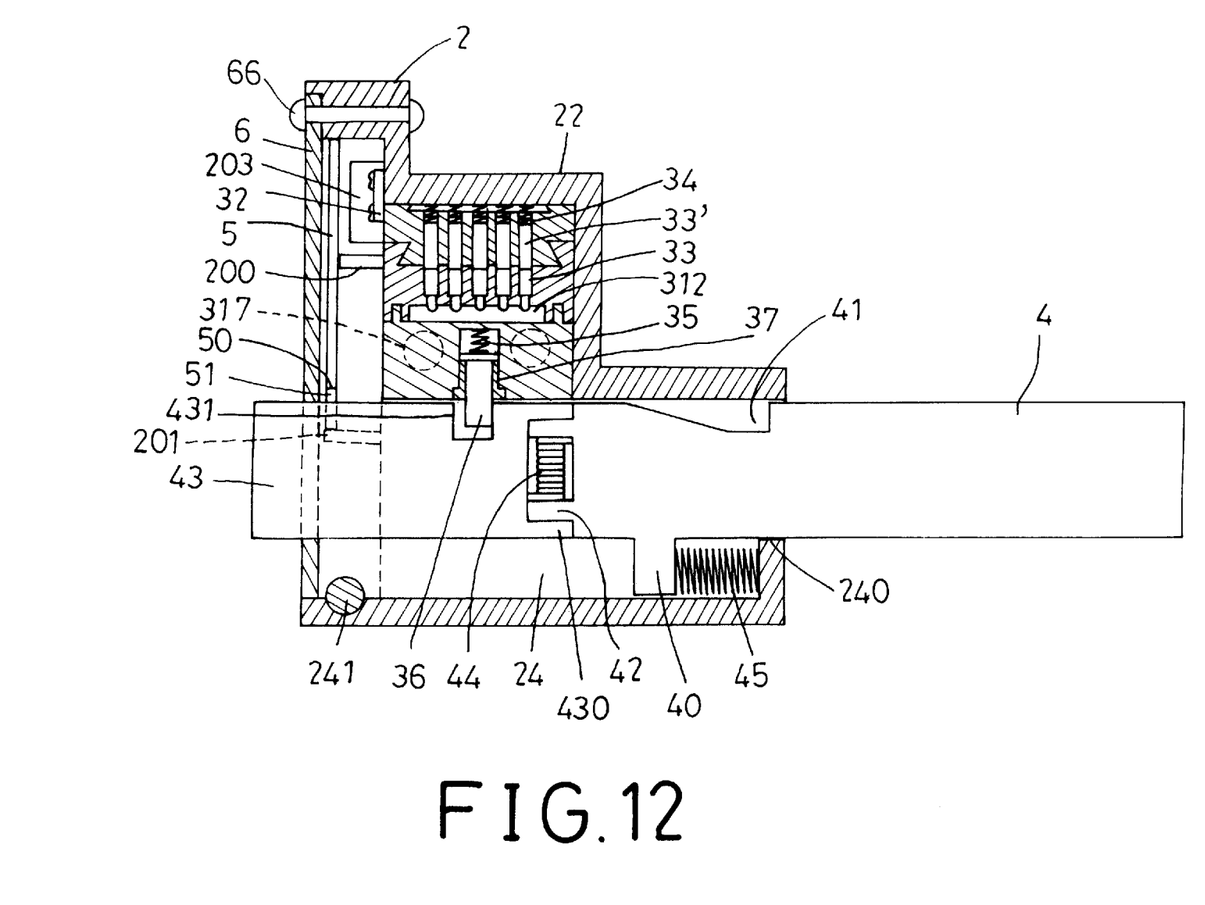
FIG. 12 is a side view of the motorcycle lock being in the locking position in the present invention.
Figure 13:
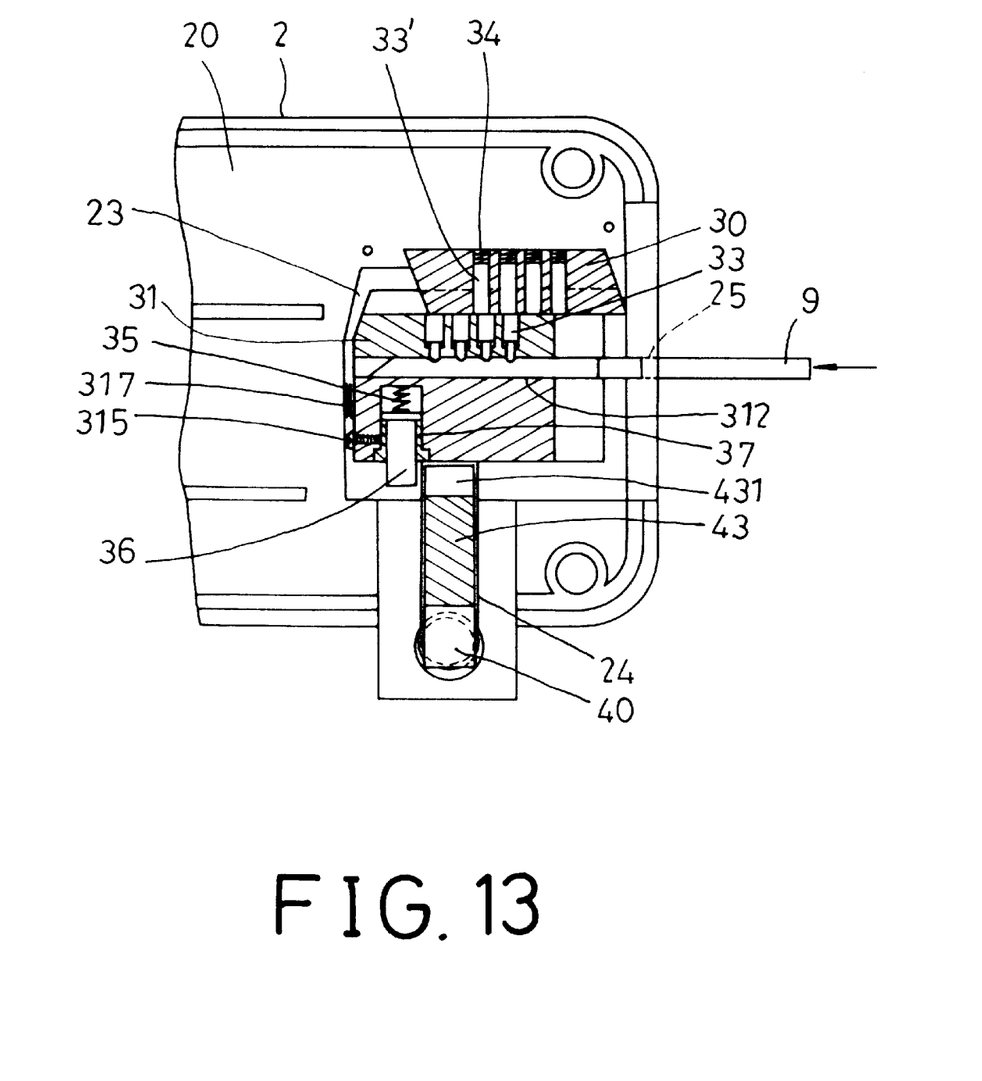
FIG. 13 is a front view of the motorcycle lock being in an unlocked position in the present invention; and, FIG. 14 is a side view of the motorcycle lock being in the unlocked position in the present invention.
Figure 14:
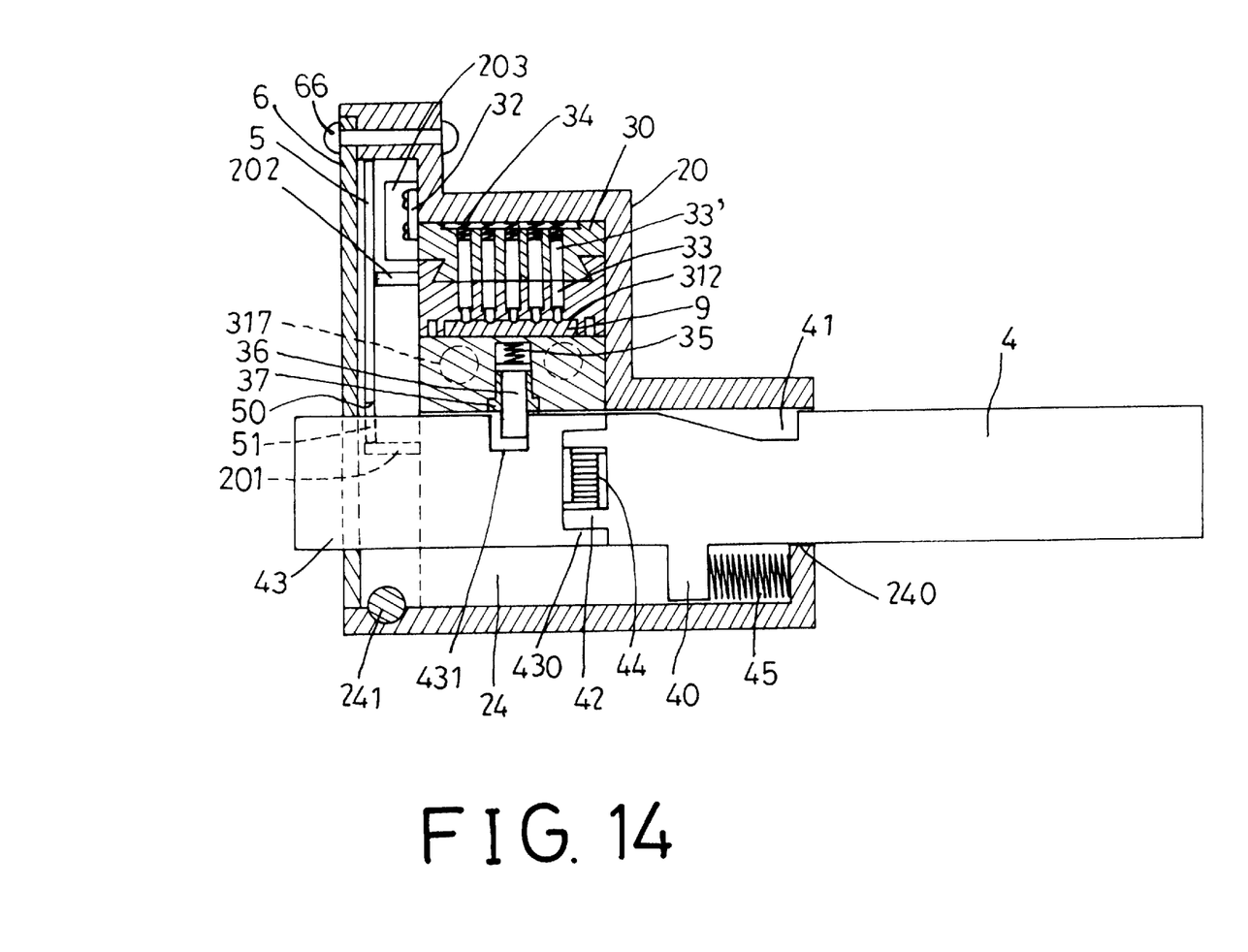

If the lock is to be locked on a wheel, as shown in FIGS. 11, 12, the push plate is swung 90 degrees to align to the locking rod 4, and then is pushed inward together with the lock rod 4, letting the locking rod extend in the hole 240 in a rear wall of the locking member 22 of the base 2 and further into the wheel, and the pin 36 of the slide block 31 slide backward along the slope 411 of the insert cut 41 of the lock rod 4 until the pin 36 fit in the groove 431 of the push plate 43 (as the pin 36 is pushed by the spring 35, it can elastically shrink and lengthen) to become locked, with the locking rod 4 impossible to retreat. And the lock rod 4 has its rear end extend stabilized in the wheel, which cannot then rotate. In addition, in locking the key 9 is not needed, with one hand possible to operate, very convenient. If the lock is to be unlocked, as shown in FIGS. 13, 14, the key 9 is inserted in the key holes 81, 25 and 312, pressing the locking pins 33, 33' in the holes 311, 300 of the slide block 31 and the base block 30 to move up locking pin 33' to an unlocked position, wherein the locking pin 33x' no longer hampers the slide block 31, which then can slide, and then the key is further pressed down to let the base block 30 slide downward, with the pin 36 of the slide block 31 disengaging from the groove 431 of the push plate 43. Then the locking rod 4 and the push plate 43 are no more hampered by the pin 36, with the spring recovering its elasticity to automatically push the locking rod 4 inward to the original unlocked position, thus unlocking this lock completely from the wheel. The push plate 43 recovers its own position, attracted by and contact with the magnet 21.

The invention has the following advantages, as can be understood from the aforesaid description.

1. The whole lock is combined on a front fork, saving space for placing it without possibility of losing.

2. The bolts used to combine the lock on a wheel is hidden by the stop plate, preventing the lock from prying unlocked by a thief, having excellent anti-theft effect.

3. In locking the lock, the key is not needed, easy and quick to operate.

4. In unlocking the lock, the key is inserted in the keyholes and lightly pressed inward, and the lock is automatically unlocked, with only one hand, convenient to operate.

5. During running of a motorcycle, the push plate 43 pivotally connected to the lock rod in 90 degrees is attracted with the magnet 21, securing the locking rod in the lock, preventing the locking rod from sliding into the front wheel, safeguarding the motorcycle in running.

6. The housing covering the lock itself has function of preventing the lock from soiled by dirt and water, holding the interior of the lock clean so as to operate normally for a very long time, having a long service life.

While the preferred embodiment of the invention has been described above, it will be recognized and understood that various modifications may be made therein and the appended claims are intended to cover all such modifications that may fall within the spirit and scope of the invention.

What is claimed is:

1. A motorcycle lock comprising:

A base having a hollow chamber, a plurality of slots and a hole formed in a rear wall of said hollow chamber for bolts to pass through, a locking member combined behind said base, said hollow chamber having an opening extending into said locking member, a slide groove formed under said opening, a hole formed behind said slide groove and extending through said locking member, said locking member having a key hole in a side wall to communicate with said opening, said base further having a cut in a side wall;

A locking means placed in said opening of said base;

A locking rod positioned in said slide groove of said base, having a downward projection, a spring located in a bottom of said slide groove and pushed by said downward projection, said locking rod having an insert cut on an upper surface, two pivotal ears formed in a front end, a push plate pivotally connected to the front end of said locking rod and having two ears formed in a rear end to pivotally connect to said locking rod, a twist spring fitted around a pivot of said pivotal connection, said push plate having a groove in an upper surface thereof;

A stop plate positioned to close up said hollow chamber of said base, said stop plate having a recess in a right bottom edge with a stop surface;

A fix plate provided located before said hollow chamber of said base, the fix plate having slots and holes corresponding to said holes of said base, a rectangular hole facing said slide groove of said base, a plurality of holes bored around a circumferential edge for a plurality of bolts to pass through to screw tightly in said hollow chamber of said base;

Said stop plate hiding said locking means combined in said base to prevent said lock from being unlocked, said base covered with a housing for fixing on a front fork of a motorcycle by means of a constrictor tightly fitting around said front fork, said push plate swung from a vertical position to said locking rod to an aligned position and pushed to push said locking rod rearward to fit in a front wheel to hamper said front wheel from rotating and locking said motorcycle lock on said front wheel of a motorcycle without using a key, in unlocking said lock said key inserted in said key hole to permit said locking rod to retreat to its unlocked position elastically pushed by said spring by leaving an interior of said front wheel, locking and unlocking said motorcycle lock possible to operate with only one hand, said motorcycle lock being impossible to be lost as it is fixed on said front fork when not being used, said push plate located 90 degrees to said locking rod during running of said motorcycle and preventing said locking rod from moving rearward into said front wheel, and safeguarding a motorcycle in operation.

2. The motorcycle lock as claimed in claim 1, wherein said hollow chamber of said base has a magnet, and said fix plate has a hole aligned to said magnet to attract said push plate tightly located in front of said fix plate.

3. The motorcycle lock as claimed in claim 1, wherein said locking means is comprised of a base block, a slide block and a position plate, said base block located in an upper portion of said opening of said base and having plural holes in an upper surface and a dove-tail lower portion, said slide block positioned under said base block and having two opposite dove-tail grooves on an upper end to engage said dove-tail lower portion of said base block and plural holes on an upper surface to correspond to said plural holes of said base block, two locking pins and a spring inserted in each of said holes of said base block and said slide block, said slide block having a key hole in a side wall and a recess formed in a bottom, a spring, a pin and a sleeve inserted in said recess, said pin extending down through said slide block to push an upper surface of said locking rod, said slide block having a hole in one side to contain a spring to push back said slide block, said position plate fixed in said hollow chamber of said base and securing said base block and said slide block in said opening of said base.

4. The motorcycle lock as claimed in claim 1, further including a pin fitting in said groove of said push plate to lock said motorcycle lock.

5. The motorcycle lock as claimed in claim 1, wherein said locking rod has said insert cut formed with a stop surface in one side and a slope formed in the other side, and permitting said locking rod to slide in one direction to lock said motorcycle lock without using said key.

6. The motorcycle lock as claimed in claim 1, wherein a housing is provided to cover around said base, the housing having a keyhole aligned to the keyhole of the locking member.

* * * * *